Jan. 14, 1941.  L. M. KNOUSE ET AL  2,228,664
PORTABLE SAW
Filed Oct. 24, 1938   3 Sheets-Sheet 1
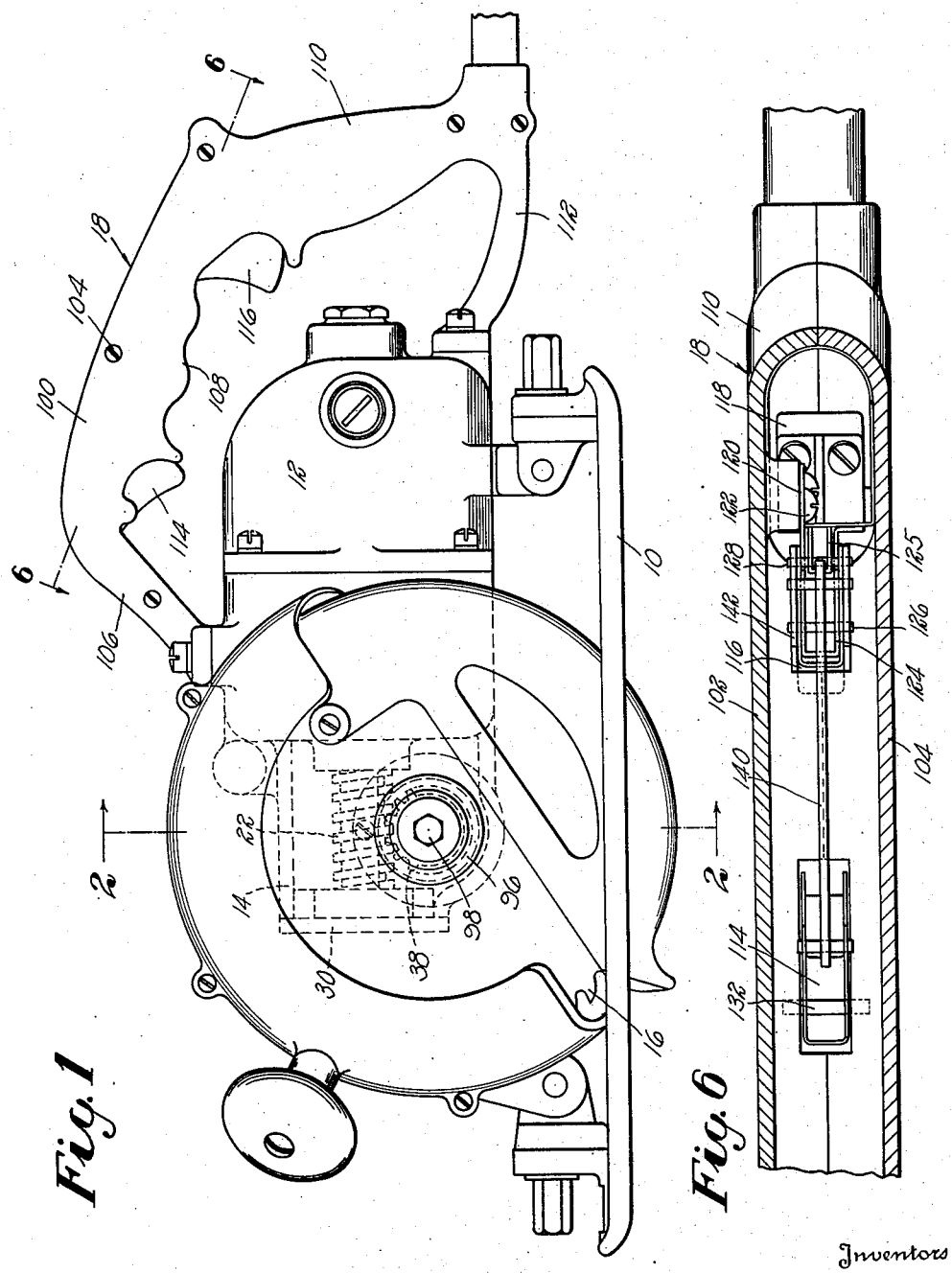
Inventors
LUCIUS M. KNOUSE
CEDRIC POWERS
By N. Clay Lindsey
Attorney

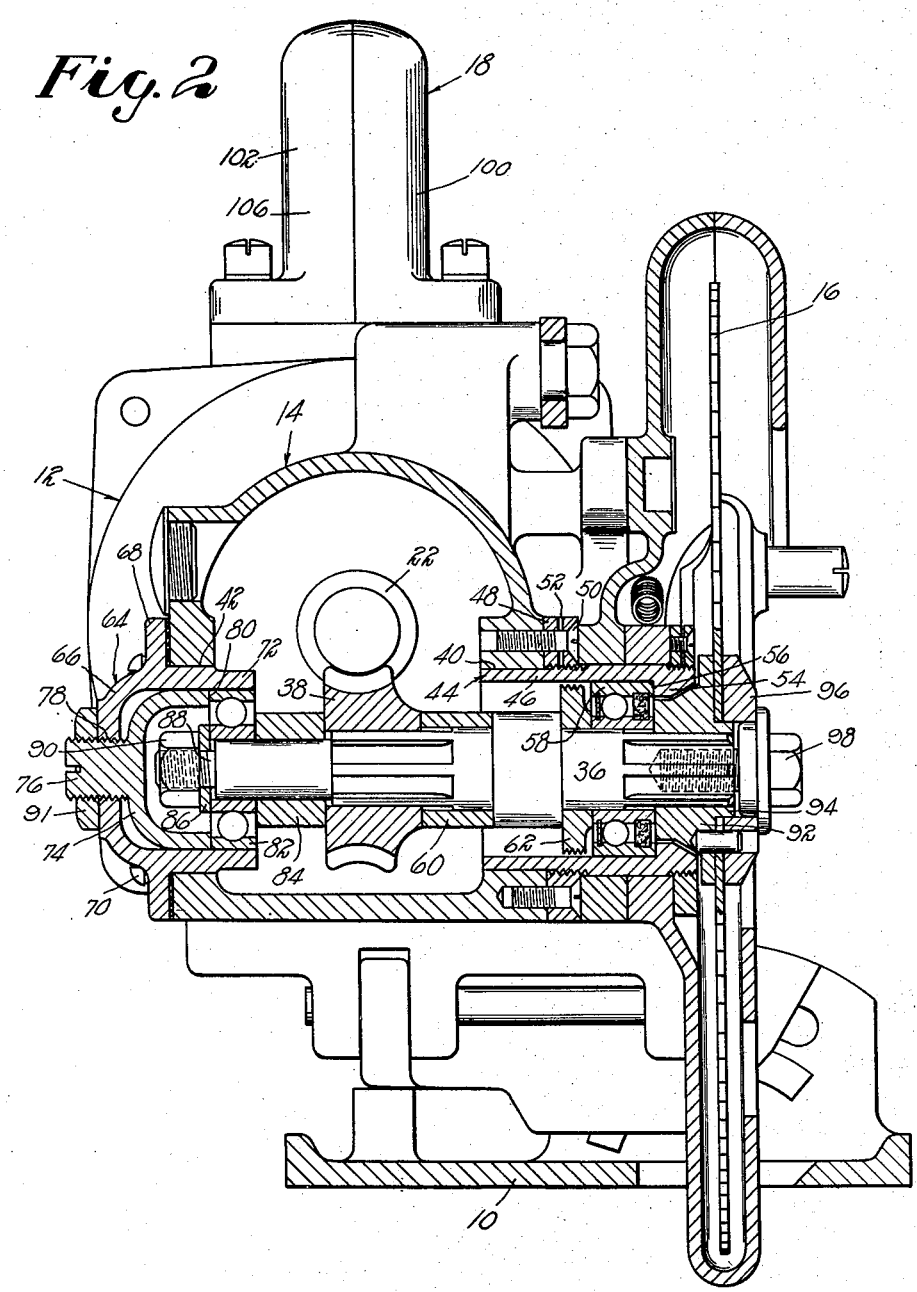

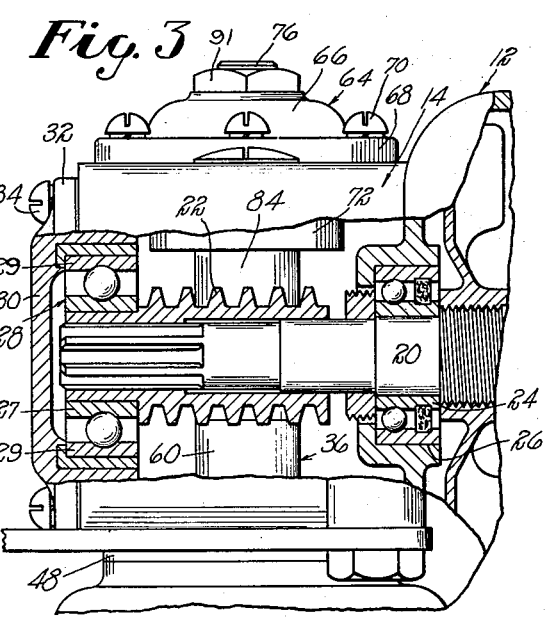
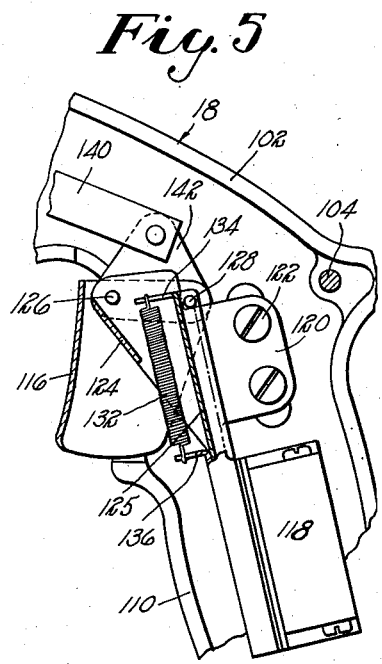
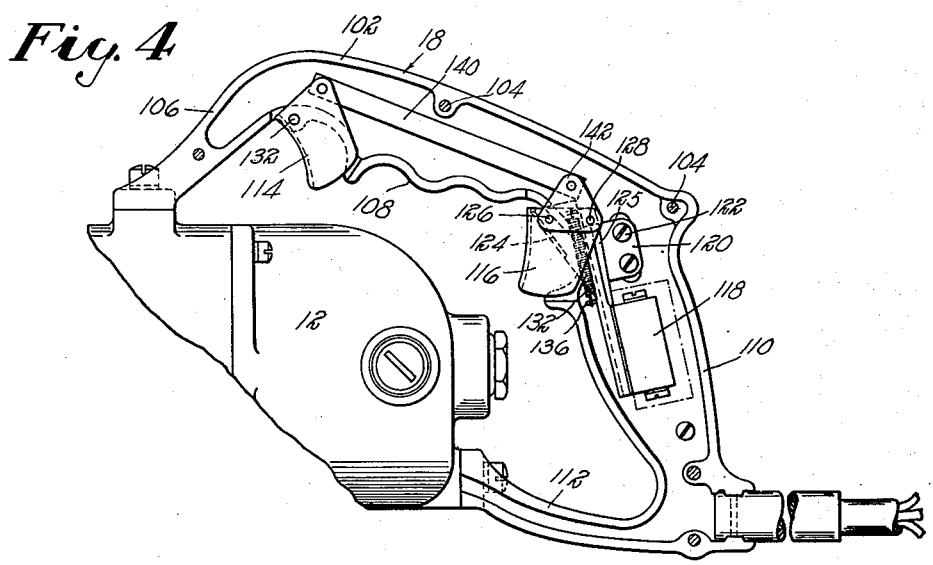

Patented Jan. 14, 1941

2,228,664

UNITED STATES PATENT OFFICE 2,228,664

PORTABLE SAW

Lucius M. Knouse and Cedric Powers, New Britain, Conn., assignors to The Stanley Works, New Britain, Conn., a corporation of Connecticut Application October 24, 1938, Serial No. 236,667

4 Claims. (Cl. 74—400)

The present invention relates to portable power driven tools and more particularly to a portable power driven high speed hand saw.

Power driven hand saws usually comprise a motor mounted in a suitable housing or casing, a rotatable blade arranged in a plane parallel to the vertical plane through the motor, and suitable driving connections from the motor to the blade. It is essential in this type of saw, due to the high speed of rotation, that the intermeshing helical gears carried on the motor shaft and on the saw arbor or shaft, be in proper alignment in order to obtain smooth operation of the device. In order to obtain this alignment, it has generally been necessary to carry out repeated truing up operations, necessitating repeated assembling and disassembling and adjustment of the parts until the proper alignment has been obtained.

An object of the present invention is to overcome the above difficulties and objections by providing an adjustable mounting means for one of the gears, preferably the worm gear on the saw arbor, and to make it possible to assemble the saw and then align the worm and worm gear with respect to one another and then lock the gears in accurate alignment. With this arrangement, it is possible to make up the parts within standard manufacturing tolerances and then adjust them relative to one another without resorting to repeated truing operations.

Another object of the present invention is to provide a handle having duplex grips so positioned relative to the balance of the structure that the saw may be readily operated for any type of cut. The handle may further be provided with a plurality of switch triggers so positioned relative to each grip that the switch triggers will always be readily actuated by the index finger of the hand of the operator.

Other objects will be in part obvious and in part pointed out more in detail hereinafter.

The invention accordingly consists in the features of construction, combination of elements, and arrangement of parts which will be exemplified in the construction hereafter set forth and the scope of the application of which will be indicated in the appended claims.

In the accompanying drawings:

Figure 1 is a side elevational view illustrating an electrically driven hand saw embodying the present invention;

Fig. 2 is a sectional view taken along the line 2—2 of Fig. 1 illustrating the improved drive connection between the motor and the saw blade;

Fig. 3 is a fragmentary top plan view, partly in section, illustrating the worm;

Fig. 4 is a side elevational view illustrating an improved handle having a switch mechanism mounted therein;

Fig. 5 is an enlarged fragmentary elevational view illustrating a portion of the switch mechanism shown in Fig. 4; and Fig. 6 is a sectional view taken along the lines 6—6 of Fig. 1 illustrating a preferred manner of linking a pair of triggers for actuating the switch.

Referring to the drawings, and more particularly to Figs. 1, 2, and 3, there is shown a portable power driven saw which, for purposes of illustration, is electrically driven and includes a base 10, a motor housing 12 in which there is positioned a suitable motor (not shown), a gear casing 14 extending forwardly from the motor housing 12 and in which the driving connections are located, a rotatable blade 16 having suitable top and bottom guards therefor and arranged in a vertical plane parallel to a vertical plane through the motor, and a handle 18 suitably connected to the motor housing 12. The foregoing structure is common to saws of this type, and only such description will be made of it as is necessary for an understanding of the invention herein.

As best seen in Figs. 2 and 3, the motor is adapted to rotate a shaft 20 extending longitudinally of the casing and having on it a worm 22 driven through a splined connection between the shaft 20 and worm 22. The shaft is rotatably mounted adjacent the motor in a ball bearing race 24 carried in a suitable recess 26 in the motor casing. The outer end of the worm 22 has a pressed fit into the inner ring 27 of a ball bearing race 28; the outer ring 29 of the ball bearing race being press fitted into a removable cap 30 which normally closes the end of the gear casing 14. The cap 30 is provided with a suitable flange 32 having openings therein alignable with suitable threaded openings in the end of the gear casing for the reception of securing screws 34. The cap 30, ball bearing race 28, and worm 22 may be simultaneously removed for adjusting purposes, as hereinafter described.

The saw arbor 36 is arranged transversely of the casing and carries a worm gear 38 driven through a splined connection between the arbor 36 and gear 38; the saw arbor being arranged at right angles to and in a plane below the motor shaft 20 to position worm gear 38 in meshing engagement with the worm 22.

In accordance with the present invention, the worm and worm gear are made up within standard manufacturing tolerances, and means are provided for bodily adjusting the saw arbor 36 and worm gear 38 transversely of the gear casing 14 to properly center the worm gear relative to the shaft 20 and worm 22 and thus align the gears relative to one another without the necessity of further truing in operations or disassembling of the parts. There is further provided improved means for taking up the thrust of the saw arbor, which thrust, in the embodiment illustrated, is toward the saw blade; it being understood that if the thrust were in the reverse direction the means subsequently described could be used in reversed positions.

The aforementioned results are accomplished in the embodiment shown by providing the gear casing 14 with oppositely disposed openings 40 and 42 in the side walls thereof and having their centers in axial alignment and wherein suitable arbor supporting and adjusting means are positioned. The saw arbor support adjacent the saw blade 16 comprises an arbor bearing insert 44 having a tubular sleeve 46 push fitted into the casing opening 40 and transversely movable therein. The outer surface of the sleeve 46 is provided with a threaded portion intermediate of its ends adapted to engage the inner threaded surface of a non-rotatable locking ring 48 which is fixed to the casing by suitable securing screws 50 concentric with the casing opening 40.

With this arrangement, the arbor bearing insert 44 may be moved transversely of the casing by rotating it within the ring 48, and by providing a proper pitch to the interengaged threads thereof extremely fine adjustments of the arbor bearing insert may be obtained. In order to secure the arbor bearing insert in any set position, the adjustment ring 48 is provided with a split portion 52 adjacent one of the securing screws whereby the ring may be distorted to bind the engaging threads and thus lock the arbor bearing insert in its fixed position.

The arbor bearing insert is further provided with an internal annular shoulder 54 having an inwardly facing flange or seat 56 against which there abuts a ball bearing race 58 through which the saw arbor 36 extends and in which it rotates. The ball bearing race may be properly spaced from the worm gear 38 by a suitable spacer sleeve 60 and an oil thrower 62, or by any other suitable means.

The support for the inner or opposite end of the saw arbor comprises an arbor bearing member 64 having an end cap 66 provided with a circular flange 68 secured to the casing by suitable screws 70 and an internal tubular sleeve portion 72 concentric with the opening 42. Positioned within the sleeve 72 is a tubular adjusting member 74 having a screw threaded head or stem 76 extending through a threaded opening 78 in the cap member 66 and adapted upon rotation to move the tubular member 74 transversely of the gear housing and sleeve 72. The end of the stem 76 which extends exterior of the cap may be provided with a lock nut for securing the adjusting member 74 in any set position.

Mounted within the sleeve 72 and abutting against the inner peripheral surface 80 of the adjusting member 74 is a second ball bearing race 82 through which the inner end of the saw arbor extends and in which it rotates. The ball bearing race 82 is properly spaced from the worm gear by a spacing sleeve 84, and the parts are maintained in position by a washer 86 which extends over a reduced threaded portion 88 of the arbor 36 and is secured in place by a suitable lock nut 90.

With the foregoing construction, the saw arbor and its component parts (which parts may be made within ordinary manufacturing tolerances) may be initially assembled and then inserted as a complete unit within the gear casing. With the assembled arbor inserted, in order to center the worm gear 38 relative to the shaft 20, the end cap 30, ball bearing race 28, and worm 22 may be removed to expose the parts within the casing. The adjusting member 74 at the inner end of the saw arbor may then be backed off to permit transverse movement of the saw arbor and worm 38. With the ring 48 in unlocked position, the arbor bearing insert 44 may be adjusted therein, and upon rotation thereof in a clockwise direction, as viewed from the saw blade, the shoulder 54 will abut against the ball bearing race 58 and move the entire assembly to the left; whereas, when turned in a counterclockwise direction, the shoulder 54 will be carried away from the ball bearing race 58, whereupon the saw arbor and worm may be shifted to the right.

Thus, by proper manipulation of the arbor bearing insert 44, the worm gear 38 may be centered relative to the shaft 20, and, when centered, the arbor bearing insert 44 may be locked in place by tightening up on the screw adjacent the split portion 52 of the ring 48. The adjusting member 74 may then be rotated until it abuts against the ball bearing race 82 and thus prevent any end play in the arbor, and, when adjusted, the adjusting member may be secured in place by the locking nut 91. As the thrust of the arbor is towards the saw blade, once the ball bearing race 58 is properly positioned relative to the shoulder 54 of the arbor bearing insert, the parts will remain in proper alignment and the thrust of the arbor will be taken by the arbor bearing insert.

The outer end of the saw arbor 36 may be suitably splined to receive a blade clamping member 92, which member is provided with a shoulder 94 over which the blade is positioned; the blade being secured in place by an outer clamping member 96 which also fits over the inner clamping member shoulder 94 and which is secured in place by a suitable stud 98.

Once the parts are properly aligned, the bearing cap 30 and its associated parts may be replaced and secured in position. Obviously, if it is necessary to again re-adjust the alignment at any time, it is only necessary to remove the bearing cap 30 and re-adjust the parts as above described.

There is further provided on the type of saw illustrated an improved single handle 18 having duplex grips so positioned as to enable the saw to be easily manipulated for any type of cut. The handle 18 is made of symmetrical hollow parts 100 and 102 held together by suitable screws 104 to provide an enclosure for a switch and switch actuating means, as hereinafter described. The handle includes a forward leg portion 106 secured at its lower end to the top of the motor housing 12 approximately above the center of gravity of the saw, and there extends rearwardly and substantially horizontally from the upper end of the leg portion a top hand grip 108 terminating somewhat to the rear of the housing 12. Extending downwardly from the top grip is a substantially vertical rear grip 110 having its lower end secured to the rear of the motor housing by an inwardly extending leg 112. The top or upper grip 108, being thus spaced slightly above the housing, supports the saw nearly in balance and facilitates its use when used for short cuts or whenever one hand operation is an advantage. The rear grip 110, being spaced slightly to the rear of the housing, may be used for ripping, long cross cuts, cutting out floor sections, or other heavier types of work of like character.

In order to further facilitate the handling of the saw, there is mounted on the handle 18 duplicate switch triggers 114 and 116 which are so positioned that one of the triggers will be actuated by the index finger of the hand of the operator upon the grasping of either of the respective grips. The triggers are interconnected and adapted upon actuation to operate a switch 118 secured by a suitable bracket 120 to one of the handle members by screws 122 and connecting through suitable leads (not shown) to a source of power and the motor.

The switch 118 includes a substantially U-shaped frame member 124 in which there is slidably mounted an actuating member 125. The rear grip trigger 116 has its upper forward corner pivotally mounted on a transverse pivot pin 126 extending across the frame member 124 and its rear upper corner pivotally connected by a transversely arranged pivot pin 128 to the switch actuating member 125. The member 125 is normally maintained in its lowermost position (that is, with the switch open) by a spring 132 having its ends respectively connected to a lug 134 extending from the member 125 and a lug 136 extending from the frame member 124, and is limited in its downward movement by the pivot pin 128 abutting against the upper edge of the switch supporting bracket 120. With the trigger so mounted, when the rear grip 110 is grasped, the index finger will be positioned at the trigger 116, and upon pivoting same into the handle the switch actuating member 125 will be raised to close the switch and operate the saw. The saw will remain in operation only so long as the trigger 116 is depressed, for when the trigger is released the spring 132 will urge the switch actuating member 125 downwardly to open the switch and stop the operation of the saw.

The trigger 114 is pivotally mounted on a transverse pivot pin 132 extending through the trigger adjacent the upper forward corner thereof and mounted in the handle members adjacent the forward end of the top grip and so positions the trigger that it will be actuated by the index finger of the operator when the top grip is grasped. The rear upper corner of trigger 114 is pivotally connected to one end of a bar 140 which extends rearwardly therefrom and has its other end pivotally connected to the apex of a triangular member 142 having its base pivotally connected at its opposite lower ends to the pivot pins 126 and 128, respectively. Thus when the trigger 114 is actuated, the bar 140 will be drawn upwardly and the triangular member 142 will pivot about the pin 126 to raise switch actuating member 125 to close the circuit and operate the saw.

The handle structure described thus enables the operator to use the saw to best advantage with a wide variety of work and, in effect, combines in one structure the advantages of two structures one having a top grip and the other a rear grip.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

We claim as our invention:

1. In a saw of the character described, a casing having oppositely disposed openings in the side walls thereof, said openings being in axial alignment, a motor shaft extending longitudinally of the casing, a worm carried thereon, a saw arbor extending transversely of the casing, a worm gear carried by said saw arbor and meshing with said worm, means supporting the saw arbor comprising a pair of tubular sleeves disposed in said casing openings, the outer surface of one of said sleeves being provided with a threaded portion intermediate of its ends and having on its inner surface an abutment shoulder, a locking member comprising a ring secured to the exterior of the casing and concentric with said opening and having an interior threaded portion in engagement with said threaded sleeve portion and wherein said sleeve may be rotated to adjust the same transversely of the casing, said arbor carrying a cooperating part engageable with said sleeve abutment shoulder, whereby movement of the sleeve in one direction will move said arbor in the same direction.

2. In a saw of the character described, a casing having oppositely disposed openings in the side walls thereof, said openings being in axial alignment, a motor shaft extending longitudinally of the casing, a worm carried by said motor shaft, a saw arbor extending transversely of the casing, a worm gear carried by said arbor and meshing with said worm, ball bearing races disposed adjacent the opposite ends of said arbor and in which said arbor rotates, means for supporting said ball bearing races comprising tubular sleeves disposed in said casing openings, one of said sleeves being axially adjustable in its opening and having an inwardly facing shoulder abutting against the ball bearing race carried therein, whereby movement of the sleeve inwardly of the casing will move the arbor in the same direction, and the opposite sleeve having a tubular axially adjustable member therein abutting against the ball bearing race carried therein, whereby movement thereof towards the other sleeve will maintain the opposite ball bearing race and the shoulder of the opposite sleeve in abutting relationship.

3. In a saw of the character described, a casing having oppositely disposed openings in the side walls thereof, said openings being in axial alignment, a motor shaft extending longitudinally of the casing, a worm carried therein, a saw arbor extending transversely of the casing, a worm gear carried by said saw arbor and meshing with said worm, ball bearing races disposed adjacent the opposite ends of said arbor and in which said arbor rotates, means supporting the ball bearing races comprising a pair of tubular sleeves disposed in said casing openings, the outer surface of one of said sleeves being provided with a threaded portion intermediate of its ends, and an internal shoulder abutting the ball bearing race supported thereby, a locking member comprising a ring secured to the exterior of the casing and concentric with said sleeve opening and having an exterior threaded portion in engagement with said threaded sleeve portion and wherein said sleeve may be rotated to adjust the same transversely of the casing and said other sleeve having a tubular member axially adjustable therein and abutting the ball bearing race carried thereby, whereby movement thereof towards the other sleeve will maintain the opposite ball bearing race and the shoulder of the opposite sleeve in abutting relationship.

4. In a saw of the character described, a casing having oppositely disposed openings in the side walls thereof, said openings being in axial alignment, a motor shaft extending longitudinally of the casing, a worm carried thereby, a saw arbor extending transversely of the casing, a worm gear carried by said saw arbor and meshing with said worm, means supporting the saw arbor and comprising a pair of tubular sleeves disposed in said casing openings, one of said sleeves being axially adjustable in its opening, interengaging means on said sleeve and said arbor, whereby adjustment of said sleeve inwardly of the casing moves said arbor in one direction, the other sleeve being fixed to the casing, an axially adjustable member carried in said sleeve, said member and said saw arbor having interengaging parts, whereby adjustment of said member axially of the sleeve and inwardly of the casing will move said saw arbor in the opposite direction.

LUCIUS M. KNOUSE.
CEDRIC POWERS.